United States Patent [19]

Doyon et al.

[11] Patent Number: 5,041,159
[45] Date of Patent: Aug. 20, 1991

[54] POROUS NICKEL PLAQUE FABRICATION

[75] Inventors: Joel D. Doyon, Bantam; Lawrence M. Paetsch, Sherman, both of Conn.; Mark Benedict, Jamaica Plain, Mass.; D. Lynn Johnson, Wilmette, Ill.

[73] Assignee: Energy Research Corporation, Danbury, Conn.

[21] Appl. No.: 310,295

[22] Filed: Feb. 13, 1989

[51] Int. Cl.⁵ ............................................. C22C 29/12
[52] U.S. Cl. ........................ 75/232; 75/234; 75/235; 75/951; 204/293; 419/2; 419/19; 419/45; 419/58; 419/57
[58] Field of Search ............... 419/2, 19, 45, 58, 57; 75/232, 234, 235, 951; 204/293

[56] References Cited

U.S. PATENT DOCUMENTS

| | | | |
|---|---|---|---|
| 4,077,816 | 3/1978 | Nadkarni | 148/126 |
| 4,109,060 | 8/1978 | Andersson et al. | 425/566 |
| 4,225,346 | 9/1980 | Helliker et al. | 75/211 |
| 4,379,003 | 4/1983 | Robbins et al. | 148/104 |
| 4,659,379 | 4/1987 | Singh et al. | 75/234 |
| 4,714,586 | 12/1987 | Swarr et al. | 419/2 |
| 4,762,558 | 8/1988 | German et al. | 75/246 |

FOREIGN PATENT DOCUMENTS 866082  4/1961  United Kingdom .

OTHER PUBLICATIONS

P. 110 of Phase Diagrams for Ceramists, 1964.
P. 90 of Phase Diagrams for Ceramists, 1969.
Pp. 120, 121 of Phase Diagrams for Ceramists, 1975.

Primary Examiner—Brooks H. Hunt
Assistant Examiner—Leon Nigohosian, Jr.
Attorney, Agent, or Firm—Robin, Blecker, Daley & Driscoll

[57] ABSTRACT

An improved method of forming a nickel plaque wherein an assemblage of particles of a nickel alloy are oxidized and sintered in a preselected atmosphere such that the alloying material is exclusively substantially internally oxidized and the resultant product sintered to provide a sintered porous plaque containing nickel metal and oxidized alloying material.

13 Claims, 3 Drawing Sheets

CREEP RESISTANCE OF Ni-Al ANODES

CREEP RESISTANCE VS. Ni-Al ANODE FABRICATION PROCESS

TEMPERATURE = 700° C
LOAD = 50psi

| SAMPLE | SINTER METHOD | SINTER ATMOSPHERE (H₂O:H₂ RATIO) | PERCENT CREEP |
|---|---|---|---|
| 119 | '379 PATENT | 100:1 | 10.8% |
| 120 | '379 PATENT | 100:1 | 14.7% |
| 142 | SUBJECT INVENTION (BED) | 102:1 | 4.2% |
| 143 | SUBJECT INVENTION (BED) | 102:1 | 4.1% |
| 152 | SUBJECT INVENTION (TAPE CAST) | 100:1 | 1.1% |
| 153 | SUBJECT INVENTION (TAPE CAST) | 100:1 | 3.1% |

FIG. 3

POROUS NICKEL PLAQUE FABRICATION

BACKGROUND OF THE INVENTION

This invention relates to nickel electrode fabrication and, in particular, to improved techniques for achieving this fabrication.

In U.S. Pat. No. 4,659,379, assigned to the same assignee hereof, there is disclosed a method for fabricating a nickel electrode so as to realize reduced electrode creepage and increased sintering resistance. In the method of the '379 patent, a nickel alloy material is subjected to an oxidation procedure which results in the interior of the material comprising nickel metal having dispersed therein an oxide of the alloy and which further results in the exterior of the material comprising a nickel oxide layer. Following the oxidation procedure, the material is then reduced and sintered to convert the nickel outer layer to nickel metal, thereby forming a sintered porous component having a nickel exterior and in its interior a metallic nickel matrix throughout which is dispersed an alloy of the oxide.

The '379 patent teaches that the oxidant step can be carried out as a single step in which the nickel oxide outer layer and the inner metal with dispersed oxidized alloy are formed simultaneously or in multiple steps wherein the latter is formed in a first step and the former in a subsequent step, preceded by a particle diminution step. In the multiple step case, the '379 patent indicates that this can be accomplished by using an initial atmosphere comprised of a water vapor/hydrogen mixture, possibly diluted with nitrogen, or a carbon dioxide/carbon monoxide mixture. This initial atmosphere would then be followed by an atmosphere of air or pure oxygen. The patent further gives as an example of the conditions of the first step the use of an atmosphere of water vapor and hydrogen having a ratio of partial pressures of 100 to 1. This atmosphere is applied for about 10 hours at 950 degrees centigrade. Further, as an example of the second step, the patent calls for an atmosphere of pure oxygen applied for about 10 to 30 minutes. The patent also specifies that preferable conditions for the reduction/sintering step are a temperature in the range of 600 to 1,000 degrees centigrade and a period of time from about one-half to two hours.

While the method in the '379 patent results in a reduced amount of electrode creepage, researches have continued to look for still further procedures which can provide additional creepage reduction.

It is, therefore, a primary object of the present invention to provide an improved method of nickel electrode fabrication.

It is a further object of the present invention to provide a method of nickel electrode fabrication which results in reduced creepage during use of the electrode.

SUMMARY OF THE INVENTION

In accordance with the principles of the present invention, the above and other objectives are realized in a method wherein particles of a nickel alloy are assembled into a mass and the mass of particles is simultaneously oxidized and sintered in a preselected atmosphere such that the alloying material is exclusively substantially internally oxidized and the resultant product sintered. A porous sintered plaque containing nickel metal and oxidized alloying material results and during operation as an anode electrode the plaque is found to exhibit creep which is less than that exhibited by anodes formed conventionally or with the '379 patent method.

In one of the examples of the method to be disclosed hereinafter the alloying material is aluminum and the oxidation/sintering step is carried out in an atmosphere including water and hydrogen having partial pressures in a range of 25:1 to 110:1.

DESCRIPTION OF THE DRAWINGS

The above and other features and aspects of the present invention will become more apparent upon reading the following detailed description in conjunction with the accompanying drawings, in which:

FIG. 3 shows experimental data comparing creep deflection for anode electrodes fabricated in accordance with the invention and anode electrodes made with the method of the '379 patent.

DETAILED DESCRIPTION

Figure 1:
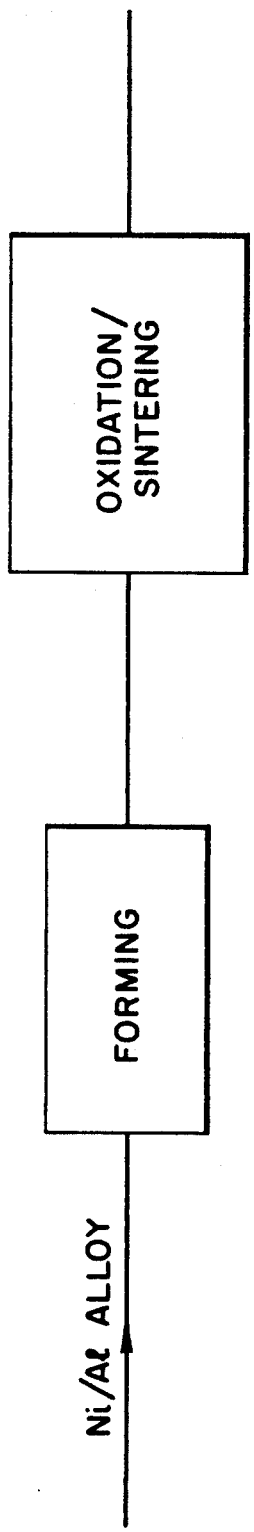
FIG. 1 shows a flow diagram illustrating a method of electrode fabrication in accordance with the principles of the present invention.

FIG. 1 shows a flow diagram of a method of fabricating a nickel anode electrode in accordance with the principles of the present invention. A nickel alloy material containing from about one to five percent alloying material is used to the anode electrode. The alloying material is preferably one which upon oxidation will provide highly stable oxides in the interior of the anode. Suitable alloying materials are aluminum, yttrium, magnesium, titanium, tantalum, molybdenum, chromium and cerium. For the present purposes, the alloy is assumed to be a Ni-Al alloy powder.

The Ni-Al alloy is subjected first to a forming step by which the alloy is formed into a mass or assemblage of particles. This is preferably accomplished by forming a slurry of the Ni-Al alloy particles and tape casting the slurry to form a porous cohesive body. It also may be accomplished by introducing the powder particles onto a support, smoothing the particles with a doctor blade and then rolling into a bed.

Once the particles are assembled, the particles are then subjected to an oxidation/sintering process under a preselected atmosphere. In accordance with the principles of the present invention, this atmosphere is such that the alloying material (aluminum) in the nickel alloy is exclusively substantially internally oxidized and the resultant product sintered. In further accord with the invention, the preselected atmosphere comprises a mixture of gases having a predetermined ratio of partial pressures.

More particularly, a preferred mixture of gasses is a combination of water and hydrogen in amount such that the ratio of partial pressures of these gases is in a range of about 25:1 to 110:1. A more preferred ratio of partial pressures is a value of 100 to 1. These gases are typically provided in a carrier gas. A preferred carrier gas is nitrogen.

The atmosphere of nitrogen, hydrogen and water is applied to the nickel alloy mass at a temperature in the range of 800 to 1100 °C. for a period of time in the range of 1 to 10 hours. A preferred temperature is about 1000° C. and a preferred time is 10 hours.

As above-indicated, the result of this processing is to substantially exclusively internally oxidize the aluminum alloy in the bulk of the nickel. At the same time, the oxidized product is sintered. The result is a cohesive anode plaque or body of porous nickel having aluminum oxide dispersed in its interior.

Figure 2:
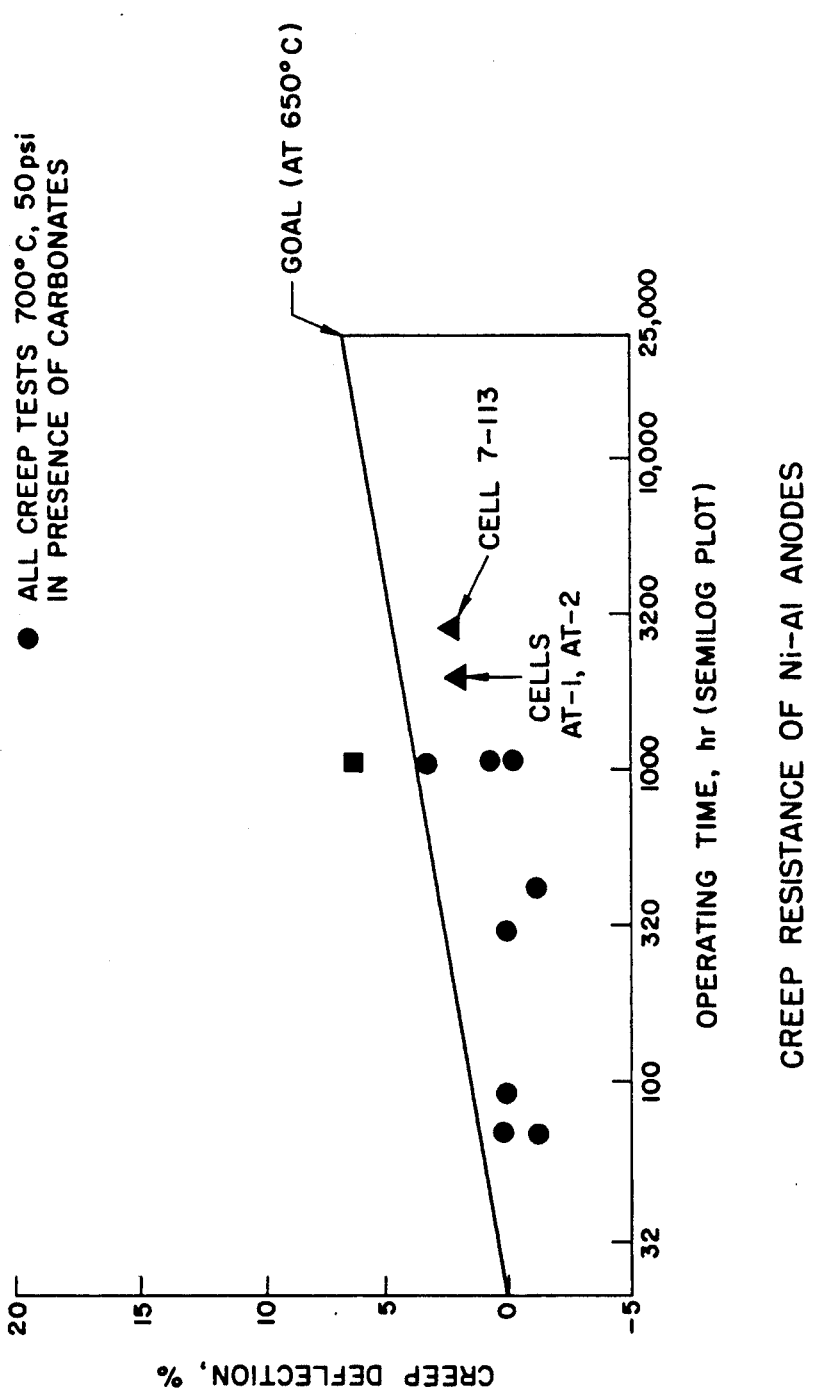
FIG. 2 depicts experimental data showing creep deflection of anode electrodes fabricated in accordance with the method of FIG. 1.

The aforesaid anode plaque formed by the method of the invention is found to exhibit enhanced resistance to creep. This can be seen in FIG. 2, which compares creep data for anodes made in accordance with the invention (data depicted by circles and triangles) with creep data for an anode made in accordance with the method of '379 patent (data depicted by squares) As shown by the data, anodes made in accordance with the invention evidence a creep deflection of between 0 and 1 percent creep after 1000 hours of anode operation as compared with a 5 to 7 percent creep for anodes made in accordance with the '379 patent. The enhanced creep resistance of the present anodes in thus evident.

FIG. 3 shows creep data for a number of anodes formed in accordance with the principles of the invention and for a number of anodes formed in accordance with '379 patent. The first set of anodes (samples 142,143) were fabricated in accordance with the invention starting with the particles in a bed form and then oxidizing and sintering. The second set of anodes (samples 152,153) were also fabricated in accordance with the invention, in this case by forming the mass by tape casting a slurry of the particles to form an initial "green" plaque and then oxidizing and sintering. Finally, the last set of anodes (samples 119 and 120) were fabricated in accordance with the method of the '379 patent. As can be appreciated, the anodes formed using the method of the invention exhibited considerably less creepage than those formed with the '379 method.

It should be noted that while the atmosphere disclosed for the oxidation/sintering process of the invention has been described as comprising a mixture of water and hydrogen in a nitrogen carrier, other atmospheres which result in the substantially exclusive internal oxidation of the alloying material can also be used. Thus, another example of a suitable atmosphere might be a carbon dioxide/carbon monoxide atmosphere.

In all cases, it is understood that the above-identified arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. A method of forming a porous nickel plaque comprising the steps of:
   assembling particles of nickel alloy material;
   simultaneously oxidizing and sintering the assembled particles in a preselected atmosphere comprised of a mixture of water and hydrogen such that the alloying material is exclusively substantially internally oxidized, and the resultant product sintered, whereby a sintered porous plaque is formed containing nickel metal and oxidized alloying material; said method including no oxidizing steps which result in the oxidation of said nickel metal.

2. A method in accordance with claim 1 wherein:
   said atmosphere comprises a mixture of water and hydrogen in amounts to provide a preselected ratio of the partial pressures of said water and hydrogen.

3. A method in accordance with claim 2 wherein: said ratio is in the range of 25:1 to 110:1.

4. A method in accordance with claim 3 wherein: said ratio is 100 to 1.

5. A method in accordance with claim 3 wherein: said atmosphere includes nitrogen.

6. A method in accordance with claim 1 wherein:
   said oxidizing and sintering step is carried out at a temperature in the range of 800° C. to 1100° C. and for a time in the range of 1 to 10 hours.

7. A method in accordance with claim 6 wherein: said temperature is 1000° C. and said time is 10 hours.

8. A method in accordance with claim 1 wherein: said step of assembling includes tape casting a slurry of said particles.

9. A method in accordance with claim 1 wherein: said step of assembling includes forming a bed of said particles.

10. A method in accordance with claim 1 wherein: said plaque is an electrode.

11. A method in accordance with claim 10 wherein: said electrode is an anode electrode.

12. A porous nickel plaque made by the method of any one of the claims 1-11.

13. A method of forming a porous nickel plaque comprising the steps of:
   assembling particles of nickel alloy material;
   simultaneously oxidizing and sintering the assembled particles in a preselected atmosphere comprised of a mixture of carbon dioxide and carbon monoxide such that the alloying material is exclusively substantially internally oxidized, and the resultant product sintered, whereby a sintered porous plaque is formed containing nickel metal and oxidized alloying material; said method including no oxidizing steps which result in the oxidation of said nickel metal.

* * * * *